(12) United States Patent
Pesenti

(10) Patent No.: US 7,373,273 B2
(45) Date of Patent: May 13, 2008

(54) LIGHT EXTRACTOR FOR A LIGHT GUIDE LAMP

(75) Inventor: Marcella M. Pesenti, Milan (IT)

(73) Assignee: 3M Innovative Properties Company, St. Paul, MN (US)

( * ) Notice: Subject to any disclaimer, the term of this patent is extended or adjusted under 35 U.S.C. 154(b) by 4 days.

(21) Appl. No.: 11/294,193

(22) Filed: Dec. 5, 2005

(65) Prior Publication Data

US 2006/0083024 A1    Apr. 20, 2006

Related U.S. Application Data

(62) Division of application No. 10/389,411, filed on Mar. 14, 2003, now Pat. No. 6,994,462.

(30) Foreign Application Priority Data

Sep. 15, 2000   (IT)   .................. PCT/IT00/00364

(51) Int. Cl.
G01B 5/02        (2006.01)
(52) U.S. Cl. .................................................... 702/159
(58) Field of Classification Search ............... 702/38, 702/40, 49, 97, 134, 135, 151, 159, 172; 362/347, 355, 610, 613
See application file for complete search history.

(56) References Cited

U.S. PATENT DOCUMENTS

| | | | |
|---|---|---|---|
| 4,805,984 A | 2/1989 | Cobb, Jr. | |
| 5,408,387 A | 4/1995 | Murase et al. | |
| 5,882,774 A | 3/1999 | Jonza et al. | |
| 5,931,555 A | 8/1999 | Akahane et al. | |
| 6,238,066 B1 * | 5/2001 | Iwasaki | ................ 362/347 |
| 2001/0005317 A1 * | 6/2001 | Ori | ..................... 362/355 |

FOREIGN PATENT DOCUMENTS

| | | |
|---|---|---|
| EP | 0 225 123 B1 | 6/1987 |
| EP | 0 534 140 B1 | 3/1993 |
| EP | 1 006 312 A1 | 6/2000 |
| IT | TO98A000513 | 6/1998 |

* cited by examiner

Primary Examiner—Edward Raymond
Assistant Examiner—Mohamed Charioui
(74) Attorney, Agent, or Firm—David B. Patchett

(57) ABSTRACT

There is described a light extractor (8) for a light guide lamp (1) whose useful surface, that is to say, the surface that, in use, faces the emission surface (5) of the light guide lamp (1), comprises a predetermined distribution of diffusing points (10) and a complementary distribution of reflecting points (9). The light extractor (8) allows obtaining an illumination having preselected features. There are also described methods for determining such a distribution of points so as to obtain a highly uniform illumination.

19 Claims, 10 Drawing Sheets

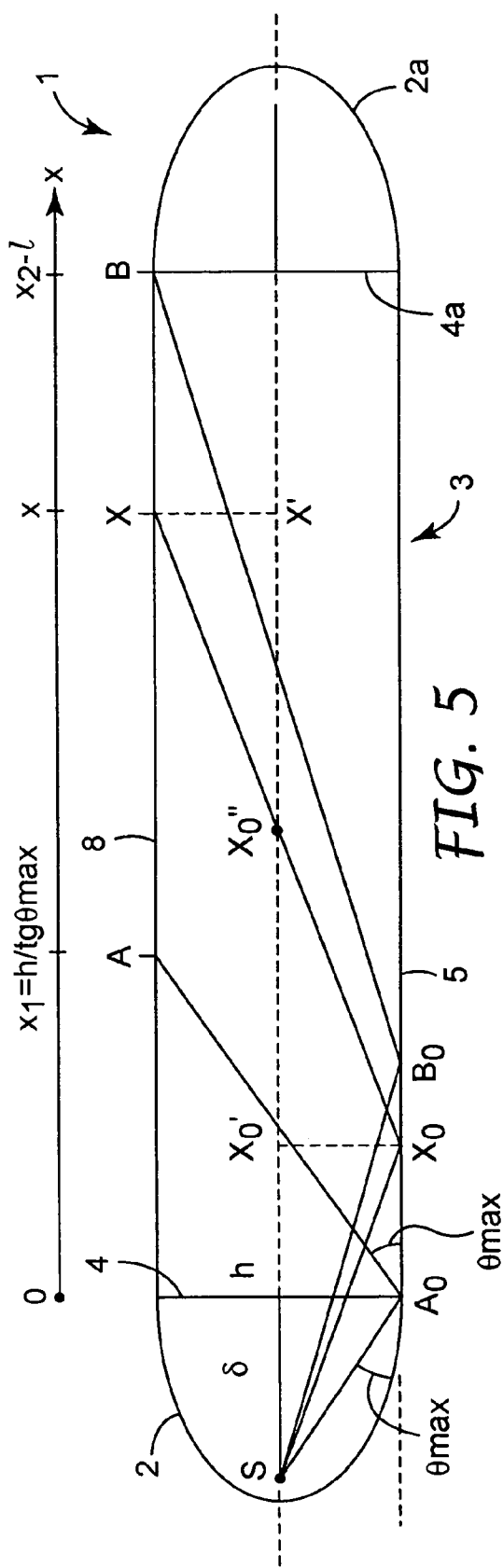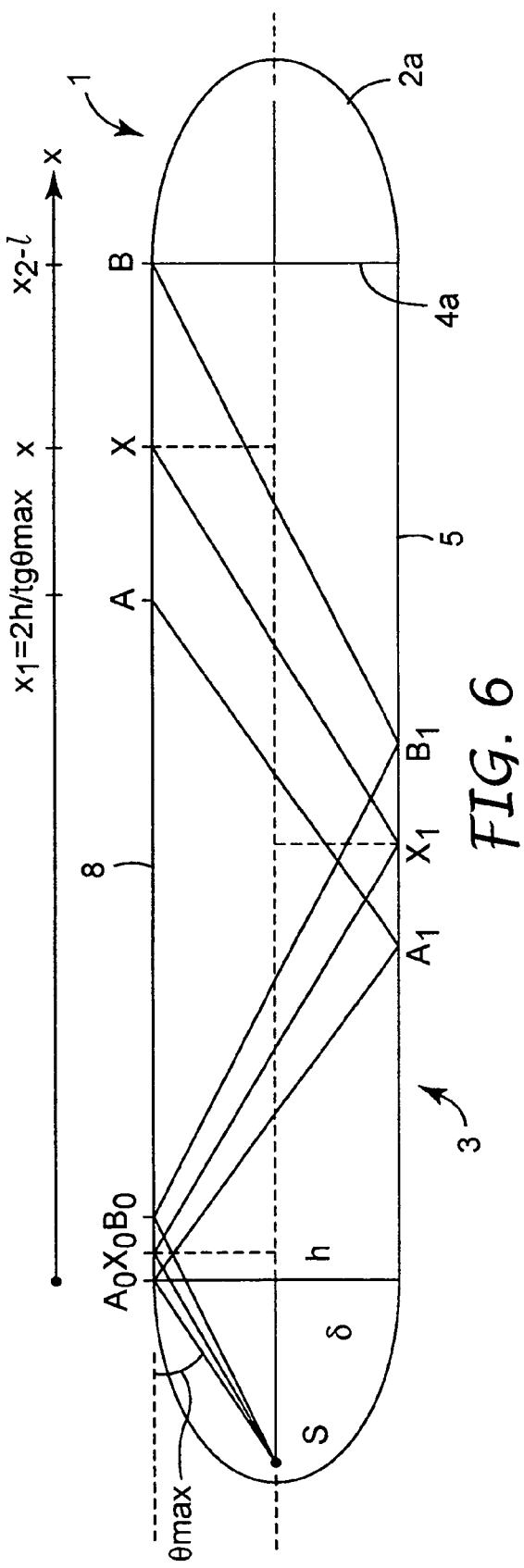

LIGHT EXTRACTOR FOR A LIGHT GUIDE LAMP

CROSS REFERENCE TO RELATED APPLICATIONS

This application is a divisional of U.S. application Ser. No. 10/389,411, filed Mar. 14, 2003, now U.S. Pat. No. 6,699,642; which claims priority from foreign application PCT/IT00/00364, filed Sep. 15, 2000.

FIELD OF THE INVENTION

The present invention relates to a light extractor for a light guide lamp. Moreover, the invention relates to a diffuser and a light guide lamp comprising it, as well as methods for determining a distribution, along a main propagation direction, of diffusing points on a light extractor, and a computer program suitable to perform the steps of one such method. The invention also relates to a method for manufacturing the light extractor and a silk-screen.

BACKGROUND OF THE INVENTION

Light guide lamps are known, and they provide for the light generated by one or more sources to be directed into a light guide, that is to say, a closed structure having a surface at least partly transparent, and at least partly reflecting on the internal side. The light rays propagate within the structure through a series of successive reflections, and exit therefrom in a more or less gradual manner. The light guides obtained through the use of total internal reflection films (or TIR films) are especially effective.

Said TIR films are known, for example, from European Patent No. EP 0 225 123, to which reference shall be made for a detailed description of their features; an example of said TIR films are those produced and marketed by Minnesota Mining and Manufacturing Company under the brand name of OLF—Optical Lighting Film. They are shaped as flexible sheets or tapes, exhibiting a surface with a series of parallel micro-relieves with a substantially triangular section; said films can be applied onto the surface of a transparent carrier material, with the microrelieves oriented in the propagation direction and usually facing outwards, thus creating an effective light guide. In fact, thanks to the optical characteristics of said films and as described, for example, in document U.S. Pat. No. 4,805,984—to which reference shall be made for further details—the light forming with the main propagation direction a smaller angle than a critical angle $\theta_{max}$ is always internally reflected, whereas the light forming with the main propagation direction a greater angle $\theta$ than angle $\theta_{max}$ is internally reflected if it is incident on the TIR film with an angle, with respect to the normal, that is smaller than a certain angle, depending on angle $\theta$. Thus, contrary to the current definition, in the following description and in the attached claims, the incidence angle of a light ray on a surface shall indicate that formed by the ray with the plane tangent to the surface.

Angle $\theta_{max}$ depends on the characteristics of the TIR film and, for the OLF film mentioned above, it is of 27.6°.

Another material used in light guide lamps is the so-called multilayer optical film, described for example in document U.S. Pat. No. 5,882,774.

Special elements called light extractors are inserted into the light guide to cause a controlled diffusion of a portion of the light travelling within the light guide, thus making some of the light rays deviate and be incident onto the TIR film with such angles as to exit from the light guide.

Known light extractors comprise, for this purpose, a typically white diffusing surface, and they consist of tridimensional bodies arranged in axial position in the light guide (reference can be made, for example, to Italian patent application TO98A000513), or of bidimensional bodies applied to the internal surface of the light guide (reference can be made, for example, to European patent application EP-A-1006312).

The technical problem at the basis of the present invention is that of providing a light extractor for a light guide lamp which should allow obtaining an illumination with preselected features, for example a highly uniform illumination.

SUMMARY OF THE INVENTION

In a first aspect thereof, the invention provides a light extractor for a light guide lamp, characterised in that its useful surface comprises a predetermined distribution of diffusing points and a complementary distribution of reflecting points.

In the present description and attached claims, the expression "useful surface" indicates the surface that, in the use of the light extractor, faces the emission surface of the light guide lamp.

Since the light incident on the reflecting points propagates through reflection, whereas the light incident on the diffusing points is deviated at such angles as to partly exit from the lamp, by controlling the distribution of diffusing points—and thus the complementary distribution of reflecting points—it is possible to control, point by point, the light diffusion properties, on the basis of the desired result when the light extractor is used in the light guide lamp.

Advantageously, the useful surface comprises a reflecting base layer and the predetermined distribution of diffusing points on the reflecting base layer. In this way, the manufacture of the light extractor is simplified.

Even more preferably, the reflecting base layer comprises the side without micro-prisms of a TIR film. In particular, the reflecting base layer can consist of the above cited OLF films or optical multilayer films.

In an embodiment, adjacent diffusing points of the predetermined distribution are at a decreasing distance along a main propagation direction from a light inlet end to an opposed end. Such an extractor, used in a light guide lamp having a single illumination system, provides an uniform illumination along the main propagation direction.

In another embodiment, the distribution of diffusing points is symmetrical with respect to a median axis perpendicular to the main propagation direction. Such an extractor is particularly useful in light guide lamps having two symmetrical illumination systems at the two ends.

In this case, in a particularly preferred way, adjacent diffusing points of the distribution of points are at a decreasing distance from each end of the extractor to the median axis perpendicular to the main propagation direction. Such an extractor provides an uniform illumination along the main propagation direction.

Advantageously, the predetermined distribution of diffusing points is imprinted on the reflecting base layer through silk-screen printing.

Silk-screen printing allows easily achieving any distribution of points also on non-absorbing surfaces, with an acceptably small distance between the diffusing points.

Moreover, in a second aspect thereof, the invention relates to a diffuser for a light guide lamp comprising a light extractor as said above, and an emission surface transparent for rays forming, with a main propagation direction, a greater angle than a predetermined critical angle, and internally reflecting for rays incident with a smaller angle than the predetermined critical angle.

Typically, the emission surface comprises a transparent support layer and a total internal reflection film applied on the transparent support layer.

Preferably, the total internal reflection film has micro-reliefs facing outwards, and oriented in parallel to the main propagation direction.

Since the light emitted by the TIR film, in particular by the above-cited OLF, has a fixed output angle with respect to the longitudinal direction of the micro-reliefs, their arrangement as indicated allows minimising the visual perception of the shadows caused by said angle.

Preferably, the light extractor has a cross section selected from the group consisting of rectilinear, semicircular, semi-elliptical, parabolic, semi-parabolic, or according to higher-order curves, and the emission surface has a cross section selected from the group consisting of rectilinear, semicircular, semi-elliptical, parabolic, semi-parabolic, or according to higher-order curves.

Preferably, moreover, the maximum distance between extractor and emission surface in a plane perpendicular to the main propagation direction is a preselected fraction of the length of the extractor in the main propagation direction, even more preferably, it is equal to about a twentieth part. In this way, the light propagates with a sufficiently small number of incidences, and thus, with few losses.

Moreover, in another aspect thereof, the invention relates to a light guide lamp comprising a diffuser as said above, and at least an illumination system suitable to project the light into the diffuser with smaller angles than the critical angle of the emission surface.

Those rays projected into the diffuser which are incident first of all onto the emission surface, are thus totally internally reflected, whereas those incident first of all onto the extractor are reflected or diffused according to whether they are incident on a diffusing point or on a reflecting point.

Moreover, in another aspect thereof, the invention relates to a method for determining a distribution along a main propagation direction of diffusing points on a useful surface, elsewhere reflecting, of a light extractor intended to be coupled to an emission surface, transparent for rays propagating with a smaller angle than a predetermined critical angle, and internally reflecting for rays propagating with a greater angle than the critical angle, in a diffuser for a light guide lamp having an illumination system suitable to project the light of a light source into the diffuser with smaller angles than the critical angle, the method comprising the steps of:

(a) setting a first point of the distribution as the point of final incidence on the extractor closest to the illumination system of a light ray propagating according to a preselected type of trajectory, (b) setting a second point of the distribution as the point of final incidence on the extractor farthest from the illumination system of a light ray propagating according to the preselected type of trajectory, (c) recursively determining, for each point of the distribution of points, a new point of the distribution as the point of the extractor equally illuminated by a first point source arranged at the preselected point of the distribution, and by a second point source arranged at a next adjacent point of the distribution, the intensities of the point sources being a function of the intensity of the light source and of a characteristic distance of the preselected type of trajectory.

A light extractor having the light distribution thus determined allows obtaining, in use, a sufficiently uniform illumination along the main propagation direction.

Preferably, in steps (a), (b), (c), the trajectory type is classified on the basis of the number of reflections within the diffuser.

More in particular, in step (c), when the preselected type of trajectory consists of the rays that, from the light source of the light guide lamp directly strike the extractor, the intensity of each point source is given by the intensity of the light source, multiplied by an absorption-in diffusion coefficient of the extractor, and divided by the squared distance of the point of the source point from the light source.

Thus, the introduced schematisation is that each diffusing point is deemed to have a constant emission at each angle, and independent of the incidence angle of the light ray on it.

When, on the contrary, in step (c) the preselected type of trajectory consists of the rays that, from the light source, strike the extractor after undergoing at least one reflection by the emission surface, and optionally by the extractor, the intensity of each point source is given by the intensity of the light source, multiplied by an absorption-in diffusion coefficient of the extractor, multiplied, for each reflection onto the emission surface, by an absorption-in reflection coefficient of the emission surface, multiplied, for each reflection onto the extractor, by an absorption-in reflection coefficient of the extractor, and divided by the squared projection, along the main propagation direction, of the portion of the ray under consideration from the light source to the first reflection point.

Thus, to simplify the calculations, the emission surface is deemed as arranged at the extractor.

Preferably, the method further comprises the steps of:

(d) determining at least a second distribution of points through steps (a), (b), (c), for a different type of trajectory, (e) adding each second distribution of points to the distribution of points.

The result is increasingly precise as the types of trajectory considered increase, so the obtainable illumination is increasingly uniform.

Moreover, if the extractor is intended to be inserted into a light guide lamp having a second illumination system that is specular to the first illumination system and arranged at the opposed end, it comprises the step of:

(f) adding to the distribution of points the specular points of each point of the distribution of points.

Preferably, moreover, the method comprises the step of:

(g) repeating the distribution of points at constant intervals along a direction perpendicular to the main propagation direction of the extractor.

In this way, the extractor exhibits a distribution of stripes of diffusing points, and the illumination is sufficiently uniform also in planes perpendicular to the main propagation direction.

More preferably, the method comprises the further step, during the repetitions of step (g), of:

(g1) alternately staggering the distribution of points forwards and backwards in the main propagation direction by a constant interval.

In this way, it is possible to reduce the distance between points below the minimum distance imposed by the physical implementation of the extractor.

Preferably, the method further comprises the step of:
(h) rejecting, from the distribution of points, those points exhibiting a distance that is greater than a preset minimum distance from the immediately adjacent points.

In this way, it is possible to prevent obtaining a distribution having a higher precision than the physical implementation of the extractor.

Moreover, in another aspect thereof, the invention relates to a computer program comprising program code means suitable to perform the steps of the above method when the program is run on a computer.

In an advantageously parametric implementation, the computer program comprises means for receiving in input one or more of the following parameters:
critical angle of the emission surface to which the extractor is intended to be coupled,
shape and/or size of the extractor,
shape and/or size of the emission surface to which the extractor is intended to be coupled,
maximum distance of the extractor from the emission surface to which the extractor is intended to be coupled,
number, type, intensity and nature of the light sources of the illumination system to which the extractor is intended to be coupled,
minimum distance between the points of the distribution of points,
absorption-in reflection coefficient of the extractor,
absorption-in diffusion coefficient of the extractor,
absorption-in reflection coefficient of the emission surface to which the extractor is intended to be coupled,
type or types of trajectories to be considered or maximum number of reflections to be considered.

To facilitate the management of multiple simulations, the computer program can comprise means for saving the parameters entered into a file and means for loading the parameters from a file.

Preferably, the computer program generates one or more outputs, among:
the coordinates of the points of the distribution,
the percent density of the points of the distribution in elementary intervals,
a report of the preset parameters,
a graphical representation of the distribution of points,
a file of the points of the distribution in a format readable by a printing machine, in particular a silk-screen printing machine,
the geometry of each illumination system of the light guide lamp for which the extractor is intended, as a function of a preset maximum distance between the extractor and the emission surface, and of a preset critical angle of the emission surface.

The table format, the graphical representation and the report of the set parameters are useful for multiple simulations; the file in a format readable by a printing machine, for example Autocad™ and MacIntosh™, allows the integration with the extractor manufacturing step, while the determination of the geometry typically coincides with determining the focus of a reflecting parabola of the illumination system, which thus meets the requirement of projecting the light into the diffuser at smaller angles than the critical angle of the emission surface.

Typically, moreover, the computer program can be embodied into a computer readable means.

In another aspect thereof, moreover, the invention relates to a method for determining a distribution along a main propagation direction of diffusing points on a useful surface, elsewhere reflecting, of a light extractor intended to be coupled to an emission surface, transparent for rays propagating with a smaller angle than a predetermined critical angle ($\theta_{max}$) and internally reflecting for rays propagating with a greater angle than the critical angle ($\theta_{max}$), in a diffuser for a light guide lamp having at least one illumination system suitable to project the light of a light source into the diffuser with smaller angles than the critical angle ($\theta_{max}$), the method comprising the steps of:
(a) defining, for each interval of a preselected length along the main propagation direction of the useful surface of the extractor, a diffusing-points-density variable,
(b) defining, for each interval of a preselected length along the main propagation direction of the emission surface, a luminosity variable;
(c) expressing the value of the luminosity variable of each interval of the emission surface as a function of the diffusing-points-density variables of the extractor, and
(d) calculating the values of the diffusing-points-density variables of the extractor such as to equal with one another the values of the luminosity variable of all intervals of the emission surface.

As for the first method illustrated above, a light extractor having the distribution of light thus determined allows obtaining, in use, a sufficiently uniform illumination along the main propagation direction.

In a preferred embodiment of the method illustrated above:
step (a) comprises the sub-step (a1) of presetting to zero the values of the diffusing-points-density variables,
step (b) comprises the sub-step (b1) of presetting to zero the values of the luminosity variables,
the calculation step (d) is carried out through the steps of:
(d1) evaluating the values expressed in step (c) of the luminosity variable of each interval of the emission surface on the basis of the current values of the diffusing-points-density variables of the extractor,
(d2) individually incrementing the values of the diffusing-points-density variables of the extractor and
(d3) iteratively repeating steps (d1) and (d2) until the values of the luminosity variable of all intervals of the emission surface evaluated in step (d1) are equal to each other.

Preferably, moreover, the step (c) of expressing the luminosity variables comprises the steps of:
(c1) splitting the light projected by the at least one illumination system into a finite number of rays, each having an initial luminosity value,
(c2) incrementing the luminosity variable of each interval of the emission surface by the value of the final luminosity of each ray incident on it with a greater angle, with respect to the main propagation direction, than its critical angle ($\theta_{max}$), wherein:
at each incidence of a ray in an interval of the extractor, an evaluation of whether the ray is reflected or diffused is made on the basis of the value of the respective diffusing-points-density variable,
if the ray is reflected, the luminosity value of the reflected ray is obtained by multiplying the luminosity value of the incident ray by an absorption-in reflection coefficient of the extractor,
if the ray is diffused, the luminosity value of each diffused ray is obtained by multiplying the luminosity value of the incident ray by an absorption-in diffusion coefficient of the extractor,
at each incidence on the emission surface with a smaller angle, with respect to the main propagation direction, than its critical angle ($\theta_{max}$), the luminosity value of the reflected ray is obtained by multiplying the luminosity value of the incident ray by an absorption-in reflection coefficient of the emission surface.

Preferably, the method further comprises the step of:

(e) repeating the distribution of points at constant intervals along a direction perpendicular to the main propagation direction of the extractor.

In this way, the extractor exhibits a distribution of stripes of diffusing points and the illumination is sufficiently uniform also in the planes perpendicular to the main propagation direction.

More preferably, the method comprises the further step, during the repetitions of step (e), of:

(e1) alternately staggering the distribution of points forwards and backwards in the main propagation direction by a constant interval.

In this way, it is possible to reduce the distance between points below the minimum distance imposed by the physical implementation of the extractor.

Preferably, the method further comprises the step of:

(f) rejecting, from the distribution of points, those points exhibiting a distance that is greater than a preset minimum distance from the immediately adjacent points.

In this way, it is possible to prevent obtaining a distribution having a higher precision than the physical implementation of the extractor.

Moreover, in another aspect thereof, the invention relates to a method for manufacturing a light extractor as said above, comprising the steps of:

(a) providing a reflecting base layer;

(b) silk-screen printing diffusing points onto the reflecting base layer according to a predetermined distribution of points.

Although such a light extractor can be manufactured through other methods, such as printing or differently applying on a neutral substrate the distribution of diffusing points and the complementary distribution of reflecting points, silk-screen printing on a reflecting base layer allows easily obtaining, also on non-absorbing surfaces, any desired distribution of points, with an acceptably small minimum distance between the diffusing points.

Preferably, the printing step (b) is carried out by printing the distribution of points obtained according to one or the other of the above methods.

Moreover, in another aspect thereof, the invention relates to a silk-screen embodying a distribution of points obtained with one or the other of the above methods.

BRIEF DESCRIPTION OF THE DRAWINGS

Features and advantages of the invention shall now be illustrated with reference to embodiments represented by way of a non-limitative example in the attached drawings, wherein:

FIGS. 4 to 6 are views similar to FIG. 2, useful to explain said method more in detail;

In the present description and the attached claims, as it will be clear hereinafter:

"diffuser" indicates a light guide structure provided with a light extractor, so that the light is partly guided and partly exits, "diffusing point" indicates a point of a surface having such optical characteristics that a ray incident onto it generates a bundle of light rays reflected within the local bending angle of the surface, thus being comparable to a point source; thus, in principle, also a hole could be used, the term "direction" is used so as to include curvilinear directions.

DETAILED DESCRIPTION

Figure 1:
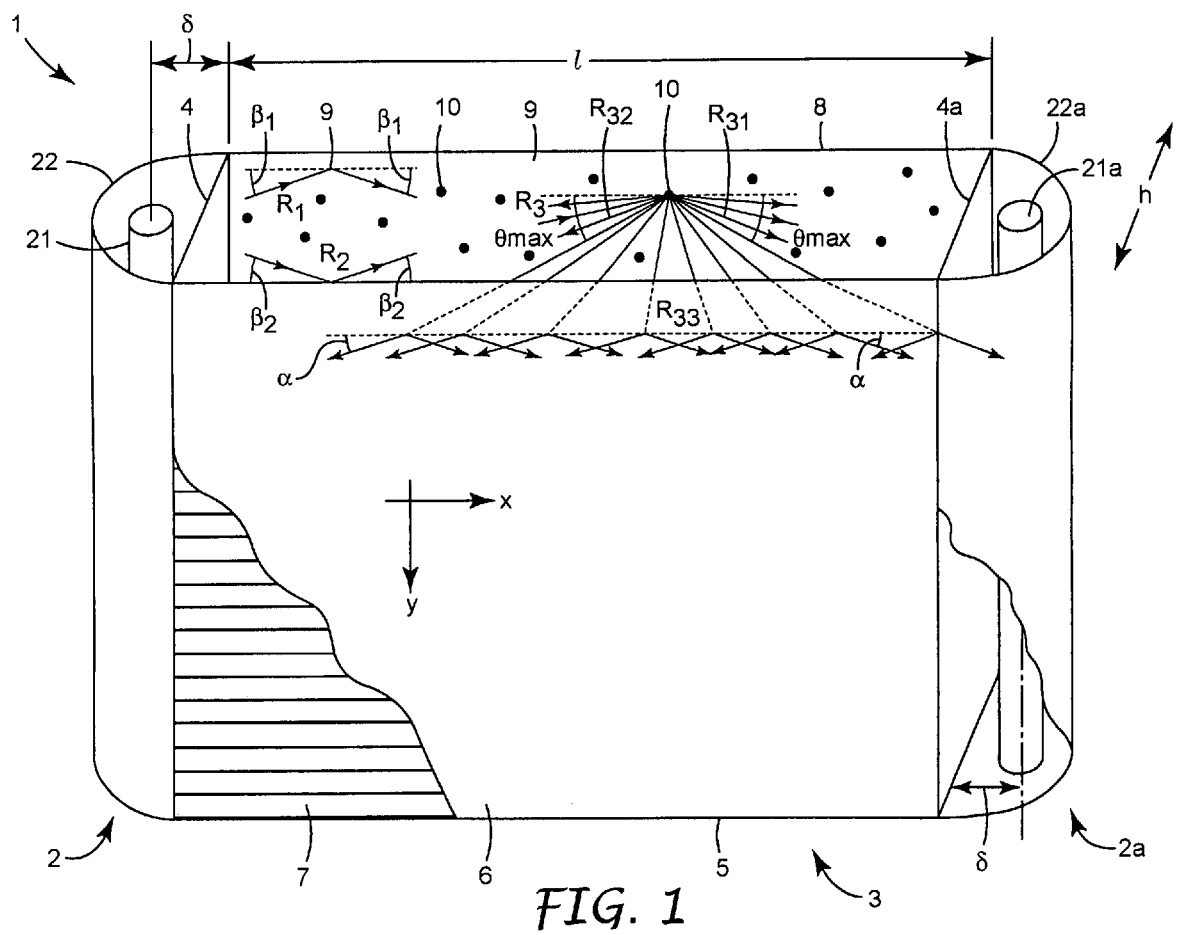
FIG. 1 schematically shows, out of scale, a light guide lamp embodying the present invention, in a first embodiment.

FIG. 1 illustrates a light guide lamp 1 comprising two illumination systems 2, 2a, and a parallelepiped-box-shaped diffuser 3, coupled to them through respective glasses 4, 4a. The light guide lamp 1 may alternatively comprise a single illumination system, for example only illumination system 2.

Diffuser 3 comprises an emission surface 5 and a light extractor 8, described more in detail hereinafter. In turn, the emission surface 5 comprises a transparent support layer 6 made of a rigid material, such as polycarbonate or the like, internally (as shown) or externally coated with a TIR film 7, for example the OLF film by Minnesota Mining and Manufacturing Company.

The thickness of diffuser 3, that is to say, the distance h between extractor 8 and emission surface 5, preferably is a preselected fraction of length 1 of the extractor in the main propagation direction, for example 1/20. Observing such a ratio, the light propagates with a sufficiently small number of incidences, and thus with few losses.

The TIR film 7 is preferably arranged so that its micro-relieves, schematised as lines, are horizontally oriented. In fact, the optical characteristics of the OLF film are such that the light rays exit from it at an angle α of about 15° with respect to the direction of the micro-relieves, and their horizontal arrangement minimises the visual perception of the shadows caused by said output angle.

As in the traditional applications of said OLF film, the micro-relieves preferably face outwards diffuser 3.

Each illumination system 2, 2a comprises a light source 21, 21a. The light source is a fluorescent tube having for example a 36-W power, arranged at the focus of a reflecting parabola 22, 22a. The electrical power supply and control components of the illumination system 2, 2a are not shown in detail since they are totally conventional.

Each illumination system 2, 2a is designed so as to project the light into diffuser 3 with smaller angles than the critical angle $\theta_{max}$ of the emission surface 5, or of its TIR film 7 ($\theta_{max}$=27.6° in the case of the OLF film mentioned above).

For the known geometrical properties of the parabola, wherein all rays exiting from the focus are reflected in parallel to the axis, arranging the light source 21 at the focus the above condition is obtained when distance δ between the focus and the glass 4 is given by:

$$\delta = \frac{h}{2} * tg\ \theta_{max} \quad (1)$$

The light extractor 8 consists of a substantially bidimensional body having a reflecting base layer 9 and a plurality of diffusing points 10 arranged on the reflecting base layer 9 according to a predetermined distribution.

The reflecting base layer 9 can itself be the body of extractor 8, or it can be provided as a reflecting coating onto a substrate (not shown), for example polycarbonate or glass. Preferably, the reflecting base layer 9 consists of the side without micro-prisms of the above-cited OLF film. The diffusing points 10 preferably are white points, but they can be points of another colour, and they are preferably silk-screen printed on the reflecting base layer 9.

A light extractor 8 thus made performs as a plurality of elementary extractors arranged on a reflecting surface. In fact, a light ray incident onto the reflecting base layer 9 is reflected with an angle equal to the incidence angle, whereas a light ray incident on a diffusing point 10 is diffused, that is to say, reflected in a bundle of light rays distributed over the internal solid angle of extractor 8 at the diffusing point 10 under consideration, in particular over the plane angle in the illustrated case of plane extractor 8. In a first approximation, the diffused rays can be regarded as equipotent since the differences between their intensity are infinitesimal.

Thus, with reference to FIG. 1, the three following situations occur:

- if a light ray, as ray $R_1$, is incident on the reflecting base layer 9 of extractor 8 with an angle $\beta_1$ with respect to the main propagation direction indicated by axis x, it is internally reflected within diffuser 3 with an angle that is equal to the incidence angle, that is, it further propagates within diffuser 3 with the same angle $\beta_1$ with respect to the propagation direction x, directed towards the emission surface 5;
- similarly, if a light ray, such as ray $R_2$, is incident on the emission surface 5 with an angle $\beta_2$ with respect to the main propagation direction x, it is internally reflected within diffuser 3 with an angle that is equal to the incidence angle, that is, it further propagates within diffuser 3 with the same angle $\beta_2$ with respect to the propagation direction x, directed towards the light extractor 8;
- if a light ray, such as ray $R_3$, is incident on a diffusing point 10 of extractor 8 with an angle $\beta_3$ with respect to the main propagation direction x, it is internally diffused within diffuser 3.

In the last cited case, the incident ray R3 originates two groups of secondary rays:

- rays, such as rays $R_{31}$, $R_{32}$, forming a smaller angle than the critical angle $\theta_{max}$ with respect to the main propagation direction x: they further propagate within diffuser 3, generically directed in the propagation direction or, respectively, in the direction opposed to the propagation direction;
- rays, such as ray $R_{33}$, forming a greater angle than $\theta_{max}$ with respect to the main propagation direction x.

The rays of the last considered type, such as ray $R_{33}$, when arriving at the emission surface 5 are not internally reflected, but they exit from it and contribute to the illumination of the light guide lamp 1.

Moreover, it is worth noting that, since the rays are projected by the illumination system 2, 2a into diffuser 3 with angles that are always smaller than the critical angle $\theta_{max}$, and due to the above characteristics of transmission and reflection, the light rays incident onto extractor 8 always form smaller angles than the critical angle $\theta_{max}$ with the main propagation direction x. Thanks to this, it is possible to make the reflecting base layer 9 as the side without micro-prisms of the same OLF film mentioned above, as previously indicated.

From what set forth it must be understood that the particular light extractor 8 of the invention provides an ideally unlimited flexibility of control of the light rays exiting the light guide lamp 1, that is to say, of its illumination. In the practice, this flexibility is restricted only by the resolution of the diffusing points, in turn dictated by the method used for physically implementing the light extractor 8, and by the difficulty of the calculations needed for determining the suitable distribution of diffusing points to provide the desired illumination.

For this purpose, hereinafter there is illustrated a first method for determining a distribution of the diffusing points 10 of the light extractor 8 such that the light emitted by the light guide lamp 1 is as uniform as possible.

Figure 2:
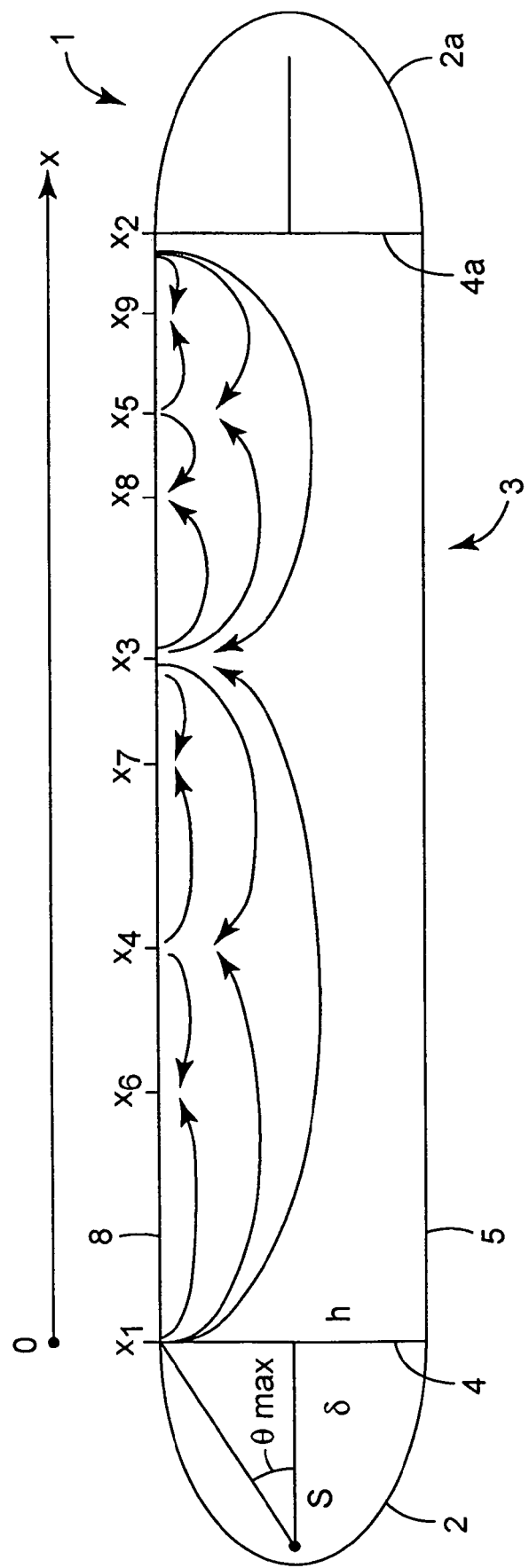
FIG. 2 shows a plan view of the lamp of FIG. 1, useful to explain a first method for determining the distribution of diffusing points according to the present invention.

The method will be illustrated with the aid of FIG. 2, which shows a plan view out of scale of the light guide lamp 1. In fact, considering the geometry of the light guide lamp and since the fluorescent-tube light sources 21, 21a emit in a substantially equipotent way along their length, the optical system can be deemed to be a bidimensional system, neglecting in a first approximation the rays that, from the light source 21, 21a of the illumination system 2, 2a, propagate along directions having a component along axis y, perpendicular to the main propagation direction x.

Let us consider, first of all, a light guide lamp 1 comprising only the illumination system 2, whose light source 21 can be regarded as a point source and has been designated with S in FIG. 2.

For what said, the luminosity at the emission surface 5 is generated only by the rays as ray $R_{33}$ of FIG. 1, that is, it is due to the plurality of point sources resulting at the diffusing points 10 on extractor 8.

By fixing the origin of axis x at the end of extractor 8 close to the illumination system 2, the distribution of the diffusing points 10 on extractor 8 along the main propagation direction x can be expressed as W(x)=x1, x2 . . . , xn where x1, x2 . . . xn are the coordinates of each diffusing point 10 of extractor 8.

In the method of the invention, to obtain the desired distribution of diffusing points, the following recursive method is applied. Firstly, it is assumed to have only two diffusing points 10 on extractor 8, arbitrarily selected or, preferably, in the way that shall be illustrated after, having coordinates $x_1$ and $x_2$, that is, W(x)=$x_1,x_2$ is set. This is represented by blocks 32 and 34 of the diagram of FIG. 3. Then, as represented by block 35 of FIG. 3, it is determined whether there exists a point $x_3$ on extractor 8 equally illuminated by the point sources with respective intensity $I(x_1)$, $I(x_2)$ arranged in the diffusing points having coordinates $x_1$ and $x_2$. If it exists, point $x_3$ is added to the distribution of diffusing points W(x), as represented by block 36 of FIG. 3. In this respect, it should be noted that since the luminous intensity is an inverse function of the squared distance from the light source, if $x_1<x_2$ then $I(x_1)>I(x_2)$ and therefore, point $x_3$ will be arranged between points $x_1$ and $x_2$, closer to $x_2$, that is, W(x)=$x_1,x_3,x_2$ assuming that the distribution W(x) is kept ordered. Continuing in the iteration, point $x_4$ equally illuminated by the point sources with respective intensity $I(x_1)$, $I(x_3)$ arranged in the diffusing points having coordinates $x_1$, $x_3$, and point $x_5$ equally illuminated by the point sources with respective intensity $I(x_3)$, $I(x_2)$ arranged in the diffusing points having coordinates $x_3$, $x_2$, are calculated, thus obtaining distribution $W(x)=x_1,x_4,x_3,x_5,x_2$, afterwards distribution $W(x)=x_1,x_6,x_4,x_7,x_3,x_5,x_9,x_2$ etcetera.

Figure 3:
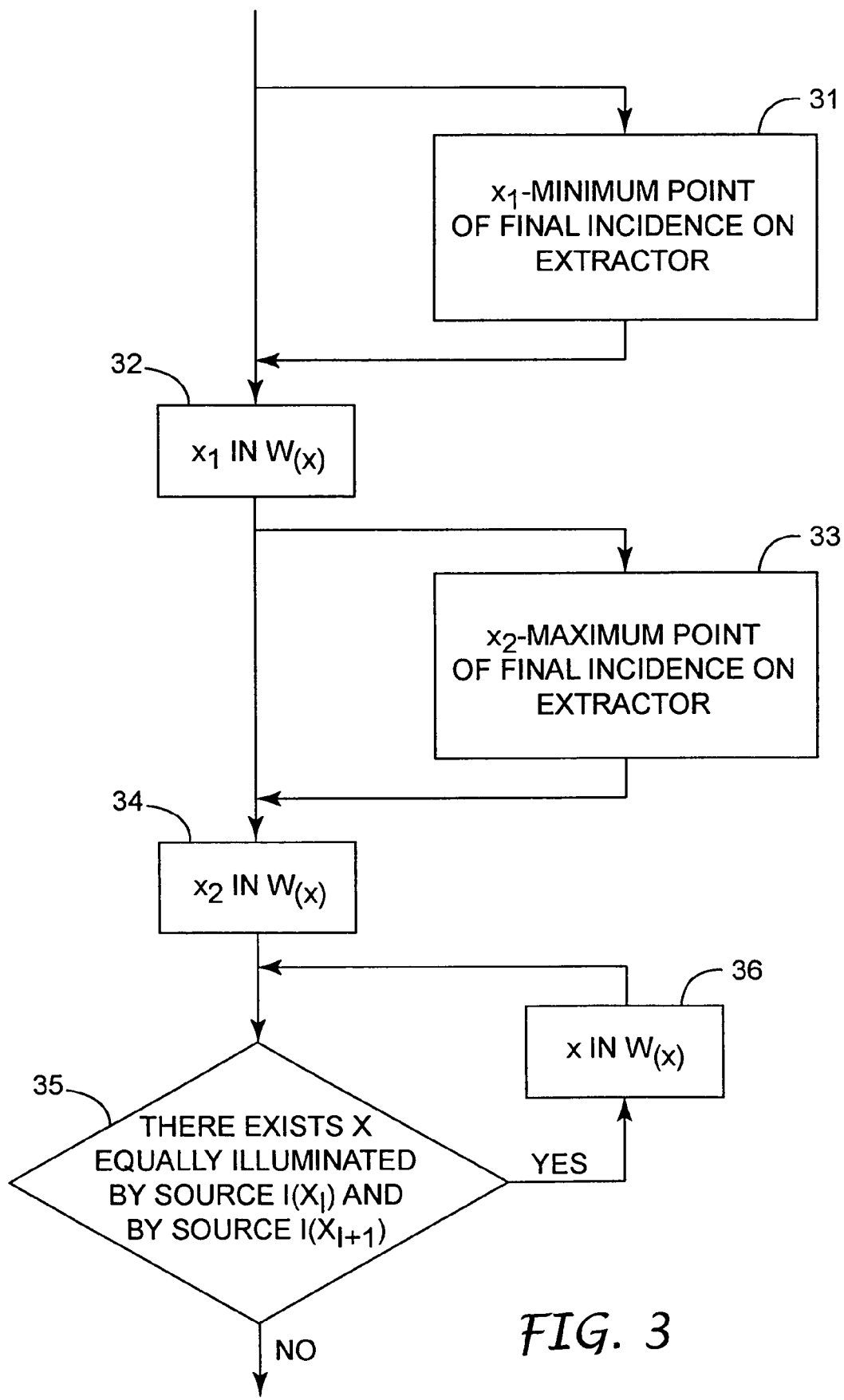
FIG. 3 shows a block diagram relating to the method illustrated in FIG. 2.

Thus, blocks 35 and 36 of the block diagram of FIG. 3 represent the recursive calculation, for each preselected point of the distribution of points, of a new point of the distribution as the point of the extractor equally illuminated by a first point source arranged at a preselected point of the distribution, and by a second point source arranged at an adjacent point of the distribution. Said recursive calculation ends when it is not possible to determine a new point, so the cycle must be understood as being repeated for each index i of the distribution of diffusing points W.

Nevertheless, the index increment has not been shown since the order in which the various pairs of adjacent points are considered is unimportant. For example, instead of considering every time in succession the two new pairs of values resulting upon adding the new value, it would be possible to consider every time only the new pair of smaller coordinates up to the end of the recursion, considering then the following pair and ending the recursion again, etcetera, so that the points of FIG. 2 would be determined in the following order: $X_1,X_2,X_3,X_4,X_6,X_7,X_5,X_8,X_9$.

The luminous intensity $I(x)$ of the point source in any diffusing point 10 of distribution $W(x)$ depends on all the light rays that, through a series of different trajectories optionally comprising reflections within diffuser 3, arrive at the diffusing point 10 under consideration.

Figure 4:
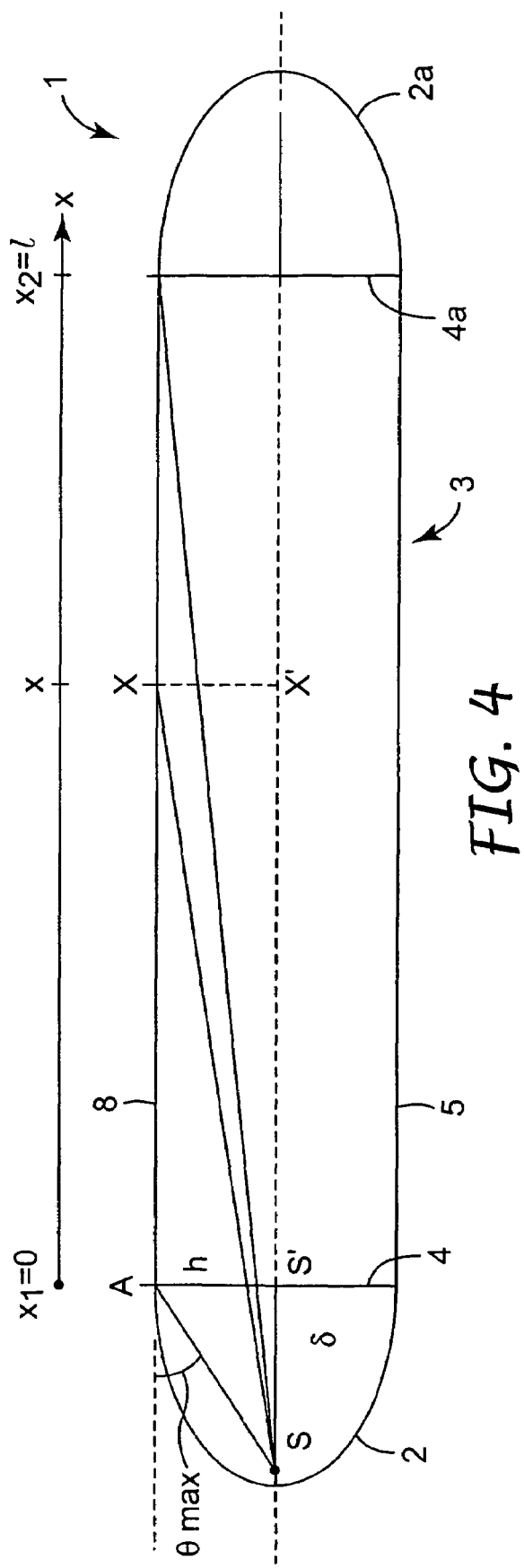

The light rays arriving at a diffusing point 10 of extractor 8 are preferably classified, from a qualitative point of view, in the following types of trajectory:

(a) rays, such as ray SX of FIG. 4, which from the light source S directly strike extractor 8 in point X, (b) rays, such as ray SX of FIG. 5, which from the light source S strike the emission surface 5 in a point $X_0$ and afterwards, extractor 8 in point X, (c) rays, such as ray SX of FIG. 6, which from the light source S strike extractor 8 in a point $X_0$ of the reflecting base layer 9, that is, in a non-diffusing point, and afterwards, the emission surface 5 in a point $X_1$ and afterwards, extractor 8 in point X, (d) rays that, from the light source S alternately strike several times the emission surface 5 and extractor 8 in a point of the reflecting base layer 9 before striking extractor 8 in a diffusing point 10;

(e) rays that are emitted by a diffusing point 10 of extractor 8 at smaller angles than the critical angle $\theta_{max}$, such as rays $R_{31}$ and $R_{32}$ of FIG. 1, strike the emission surface 5 and afterwards, strike extractor 8 in a diffusing point 10, immediately or after one or more successive reflections on points of the reflecting base layer 9 of extractor 8 and on the emission surface 5.

In practice, the above classification is based on the number of reflections within diffuser 3.

The effect of the walls of diffuser 3 on the luminous intensity can be modelled by introducing the following coefficients:

absorption-in reflection coefficient of the emission surface 5, $Rif_5$, for example $\approx 0.98$ for the OLF film, absorption-in reflection coefficient of the points of the reflecting base layer 9 of extractor 8, $Rif_8$, for example $\approx 0.98$ for the side without micro-prisms of the OLF film, or $\approx 0.95$ for a mirror, absorption-in diffusion coefficient of the diffusing points 10 of extractor 8, $Dif_8$, for example $\approx 0.80 \cdot N$ for white, silk-screen printed points, where N indicates the number of rays exiting from the diffusing point, for example selected, in the case of plane extractor, as $\pi/10$, $\pi/100$, $\pi/1000$ etcetera according to the desired precision.

It follows that the contribution to the luminous intensity $I(x)$ of the point source in any diffusing point 10 of extractor 8 due to any ray incident thereon decreases from the rays of (a) type to the rays of (e) type, and it decreases with increasing number of reflections of the rays within the various types of trajectory summarised under letters (d) and (e).

Thus, in a first approximation, it is possible to consider the rays of (a) type only. Thus, with reference to FIGS. 3 and 4, in the method according to the present invention the procedure is as follows.

As illustrated in block 31 of FIG. 3, the first point $x_1$ of distribution $W(x)$ of diffusing points 10 (point A in FIG. 4) is set as the incidence point on extractor 8 closest to the illumination system 2, of a type (a) ray, that is, of a ray that, from the light source 21 of the light guide lamp 1, indicated as point S in FIG. 4, directly strikes extractor 8. Said first point corresponds to the end close to the illumination system 2 of extractor 8, that is, to point A having coordinate $x_1=0$.

As illustrated in block 33, moreover, the second point $x_2$ of distribution $W(x)$ of diffusing points 10 is set as the point of final incidence on extractor 8 farthest from the illumination system 2 of a type (a) ray. Said point corresponds to the end of extractor 8 opposed to the illumination system 2, that is, to point B having coordinate $x_2=1$.

Indicating with K the intensity of the light source 21, the luminous intensity in a generic point X having coordinate x due to the type (a) ray is given by the expression:

$$I(x) = Dif_8 * \frac{K}{\overline{SX}^2} = Dif_8 * \frac{K}{\left(\frac{h}{2}\right)^2 + (x+\delta)^2} \quad (2)$$

where the Pythagorean theorem has been applied to triangle SXX' of FIG. 4, where X' represents the projection of point X on the longitudinal axis of the light guide lamp 1.

In block 35 of FIG. 3, coordinate x of point X of the diffuser which is equally illuminated by the point source of intensity $I(0)$ arranged in point A and by the point source of intensity $I(1)$ arranged in point B, is given by expression:

$$\frac{I(0)}{\overline{AX}^2} = \frac{I(0)}{x^2} = \frac{I(l)}{\overline{XB}^2} = \frac{I(l)}{(l-x)^2} \quad (3')$$

More in general, coordinate x of a point X equally illuminated by a point source of intensity $I(x_i)$ arranged in a point $X_i$ of the distribution of points $W(x)$ and by a point source of intensity $I(x_{i+1})$ arranged in an next adjacent point $X_{i+1}$ is given by expression:

$$\frac{I(x_i)}{(x-x_i)^2} = \frac{I(x_{i+1})}{(x_{i+1}-x)^2} \quad (3)$$

The solutions of said equation can be expressed as follows:

$$x = x_i + \frac{x_{i+1} - x_i}{1 \pm \sqrt{\frac{I(x_{i+1})}{I(x_i)}}} \quad (4)$$

or, by applying expression (2), as:

$$x = x_i + \frac{x_{i+1} - x_i}{1 \pm \frac{\overline{SX_i}}{\overline{SX_{i+1}}}} \quad (5)$$

The recursive application of the formulas with the criteria set forth above provides the desired distribution of points $W(x)=x_1, x_2, \ldots x_n$, that is, such that the illumination of the light guide lamp 1 is uniform within the limits of the simplifying assumptions formulated.

Figure 7:
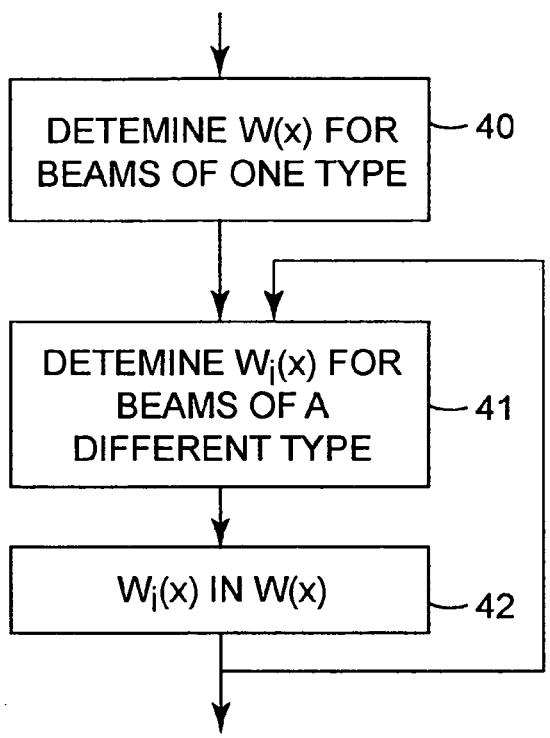
FIGS. 7 to 9 show further block diagrams relating to said method.

For the purposes of improving the approximation, the method of the present invention proposes, as illustrated in the block diagram of FIG. 7, to determine (block 41) at least a second distribution $W_1(x)$, $W_2(x)$, . . . of points in the manner indicated above, but for a different type of propagation, and to add (block 42) every second distribution $W_1(x)$, $W_2(x)$, . . . of points to the distribution $W(x)$ of points determined above (as recalled in a block 40).

For example, with reference to FIG. 5, it is possible to consider the type (b) rays according to the classification shown above, that is to say, the rays that from the light source 21 (S in FIG. 5) of the light guide lamp 1 strike the emission surface 5 in a point $X_0$ and afterwards, extractor 8 in point X.

In this case, in the step represented by block 31 of FIG. 3, the first point A of distribution $W_1(x)$ has a coordinate $x_1$ given by expression:

$$x1 = \frac{h}{tg\, \theta_{max}} \quad (6)$$

obtained observing that the light ray under consideration is reflected according to angle $\theta_{max}$ at the end point $A_0$ of the emission surface 5 close to the illumination system 2.

The second point B of distribution $W_1(x)$, calculated in the step represented by block 33 of FIG. 3, has, as for distribution $W(x)$, a coordinate $x_2=1$.

The luminous intensity in a point X having coordinate x can be deemed to be given by the expression:

$$I(x) = Rif_5 * Dif_8 * \frac{K}{\overline{SX_0}^2} = Rif_5 * Dif_8 * \frac{K}{\left(\frac{\delta + x}{3}\right)^2} \quad (7)$$

where $X_0'$ is the projection of point $X_0$ on the longitudinal axis of the light guide lamp 1. In fact, indicating with X' the projection of point X on the longitudinal axis of lamp 1 and with $X_0''$ the intersection of said axis with the reflected ray $X_0X$, from the equality of triangles $SX_0X_0'$, $X_0X_0'X_0''$ and $X_0''XX'$ it follows that $SX_0'=SX'/3$. In fact, it is more practical to use distance $SX_0'$ instead of $SX_0$ and neglect the length of portion $X_0X$, without inserting significant errors.

The coordinate x of a point X equally illuminated by the two point sources considered in turn in the recursive calculation of block 35 of FIG. 3 is of course still given by equations (3) and (4).

To further improve the approximation, with reference to FIG. 6, it is possible to consider type (c) rays according to the classification given above, that is to say, the rays that from the light source 21 (S in FIG. 6) of the light guide lamp 1 strike extractor 8 in a point $X_0$, the emission surface 5 in a point $X_1$ and afterwards, extractor 8 in point X.

In this case, in the step represented by block 31 of FIG. 3, the first point A of distribution $W_2(x)$ has a coordinate $x_1$ given by the expression:

$$x1 = \frac{2h}{tg\, \theta_{max}} \quad (8)$$

obtained from the observation of triangles $A_0A_1A_1'eA_1A_1'A$.

The second point B of distribution $W_1(x)$, calculated in the step represented by block 33 of FIG. 3, has, as for distributions $W(x)$ and $W_1(x)$, a coordinate $x_B=1$.

The luminous intensity in a point X having coordinate x can be deemed to be given by the expression:

$$I(x) = Rif_8 * Rif_5 * Dif_8 * \frac{K}{\overline{SX_0'}^2} = Rif_8 * Rif_5 * Dif_8 * \frac{K}{\left(\frac{\delta + x}{5}\right)^2} \quad (9)$$

obtained from the equality of the various triangles that the longitudinal axis of the light guide lamp 1 forms with the ray under consideration.

Coordinate x of a point X equally illuminated by the two point sources considered in turn in the recursive calculation of block 35 of FIG. 3 is, also in this case, given by equations (3) and (4).

Generalising what said above, it is easily understood that in the case of type (d) rays of the classification given above, that is, of rays that from the light source 21 strike the extractor after undergoing a reflection within diffuser 3, namely after undergoing at least one reflection by the emission source 5, and optionally by extractor 8, the intensity I(x) of each point source is given by intensity K of the light source multiplied by the absorption-in diffusion coefficient of the extractor $Dif_8$, multiplied, for each reflection on the emission surface 5, by the absorption-in reflection coefficient of the emission surface $Rif_5$, multiplied, for each reflection of extractor 8, by the absorption-in reflection coefficient of the extractor $Rif_8$, and divided by the squared projection, along the main propagation direction, of the portion of the ray under consideration from the light source S to the first reflection point $X_0$.

Finally, if one wants to consider also type (e) rays of the classification given above, for each incidence on extractor 8 in a diffusing point 10 it will be necessary to multiply the intensity I(x) of the point sources by the absorption-in diffusion coefficient of the extractor, $Dif_8$.

In case the light guide lamp 1 in which the extractor is intended to be inserted comprises both illumination systems 2, 2a, specular with one another, it would be possible to take into account the two light sources 21, 21a during all of the previous steps of the method of the invention.

Figure 8:
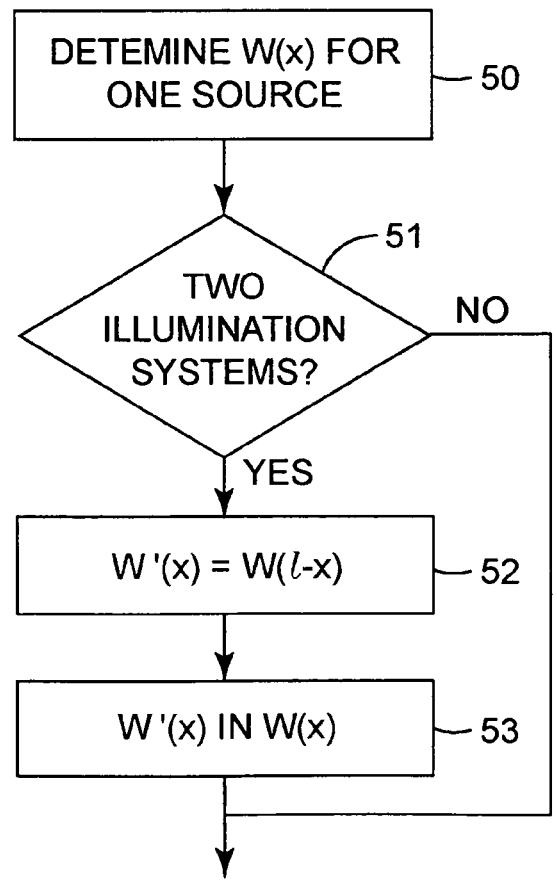

However, according to the method of the invention and as represented in the block diagram of FIG. 8, if two illumination systems 2, 2a are provided (decision block 51), it is preferably provided to determine (block 52) a second distribution of points W'=(1-$x_n$, ... 1-$x_2$, 1-$x_1$) that is specular to the distribution of points W(x) determined as indicated above (as schematised in a block 50) and to add (block 53) to the distribution of points W=($x_1$, $x_2$, ... $x_n$) the second distribution of points W'=(1-$x_n$, ... 1-$x_2$, 1-$x_1$).

In virtue of the symmetry of the light guide lamp 1, the second distribution of points W' is such as to provide a uniform illumination in a lamp 1 comprising the single illumination system 21a. Moreover, it is easily understood that the illumination due to the illumination system 21 in the presence of the points of the second distribution of points W' is equal to the illumination due to the illumination system 21a in the presence of the points of the first distribution of points W.

Having obtained the distribution of points W(x) along the main propagation direction x, the bidimensional distribution of diffusing points 10 on the reflecting base layer 9 of extractor 8 can be obtained by simply repeating the distribution of points W(x) at constant intervals Δy along direction y perpendicular to the main propagation direction x. This is represented in the left path of the block diagram of FIG. 9, wherein after having determined in a block 60 the distribution of points W(x), a cycle is entered, comprising a block 61 of increment of coordinate y and a block 62 wherein the distribution of points W(x, y) at the current value of coordinate y is set as equal to the distribution of points W(x).

Figure 10:
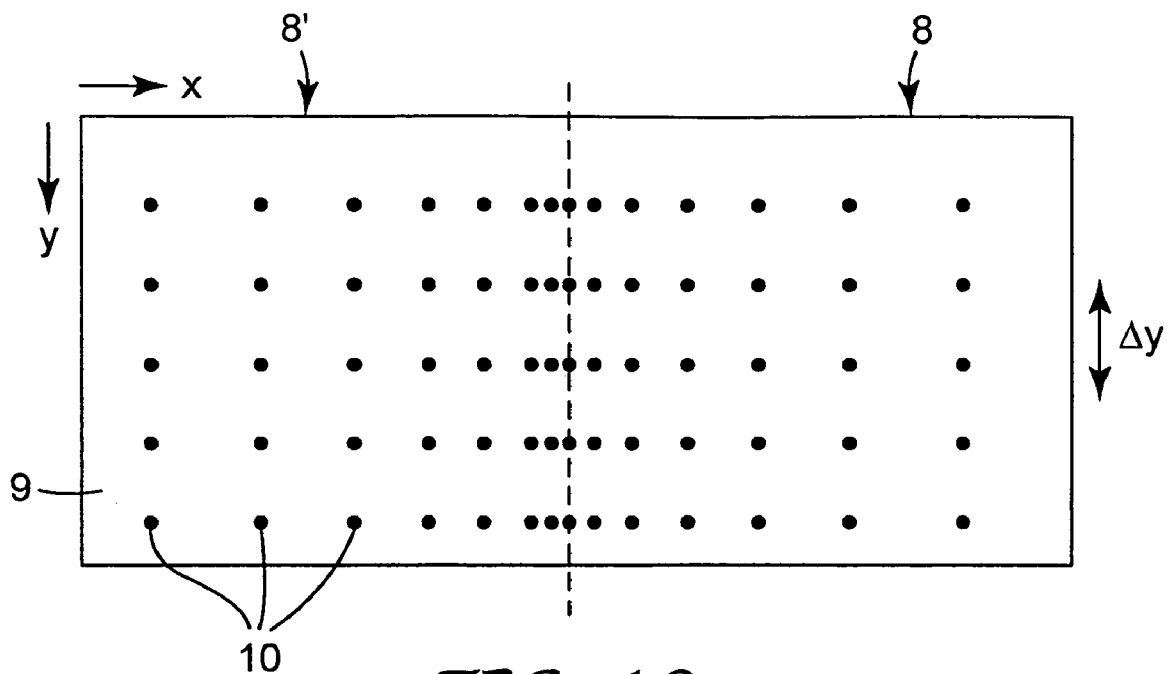
FIGS. 10 and 11 schematically show preferred embodiments of an extractor according to the invention.

Thus, as represented in FIG. 10, extractor 8 exhibits a distribution of stripes of diffusing points 10 and the illumination is sufficiently uniform in the planes that are perpendicular to the main propagation direction x.

Moreover, in FIG. 10 it can be noted that in extractor 8, the distribution of diffusing points 10 is symmetrical with respect to the median axis perpendicular to the main propagation direction x. An extractor provided with such a symmetry is particularly suitable to be used in a light guide lamp 1 having the two illumination systems 2, 2a.

Moreover, when the distribution of points is determined by applying the above method, as in the illustrated case, adjacent diffusing points 10 of the distribution of points have a decreasing distance from each end of extractor 8 to the median axis A-A perpendicular to the main propagation direction x and the extractor provides a uniform illumination along the main propagation direction x.

Analogously, if extractor 8 is intended to be used in a light guide lamp 1 having only illumination system 2, adjacent diffusing points 10 are at a decreasing distance along the main propagation direction x from a first light inlet end, that is, intended to be coupled to the illumination system 2, to the opposed end. Such an extractor is represented by extractor 8' bounded by the dashed line in FIG. 10.

Figure 11:
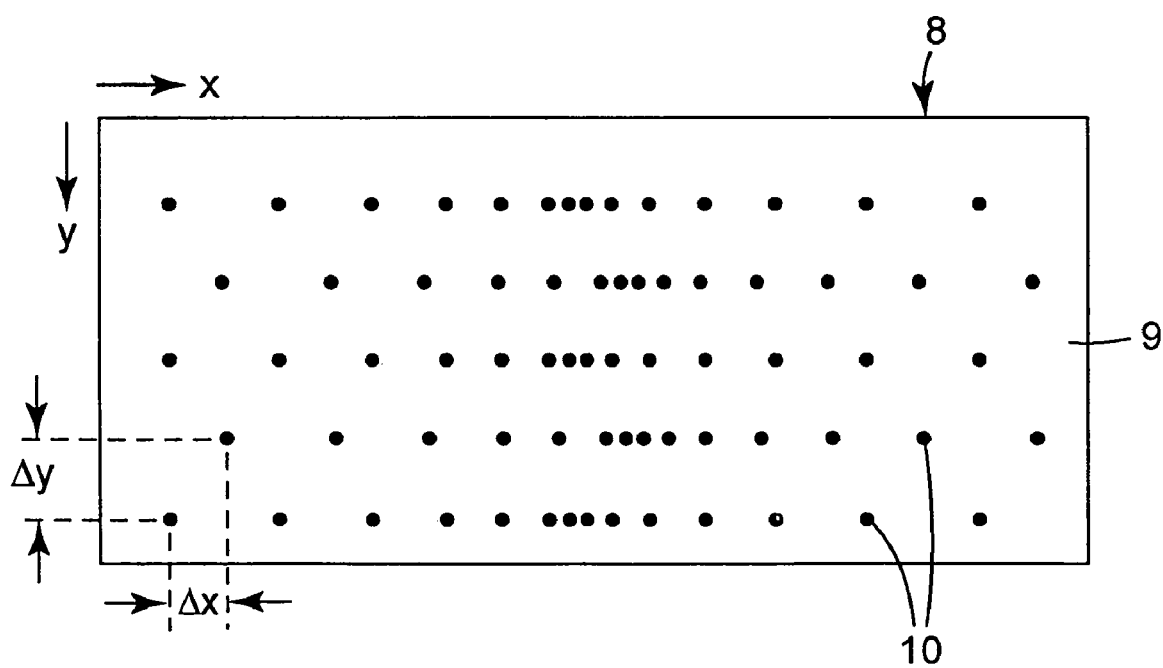

As an alternative, the distribution of points W(x) can be alternately staggered forwards and backwards in the main propagation direction x during its repetition along direction y. In this case, the diffusing points 10 on the base layer 9 of extractor 8 are arranged as rhombuses, as represented in FIG. 11. This exhibits the advantage of reducing the distance between diffusing points below the minimum distance imposed by the physical implementation of the extractor.

Figure 9:
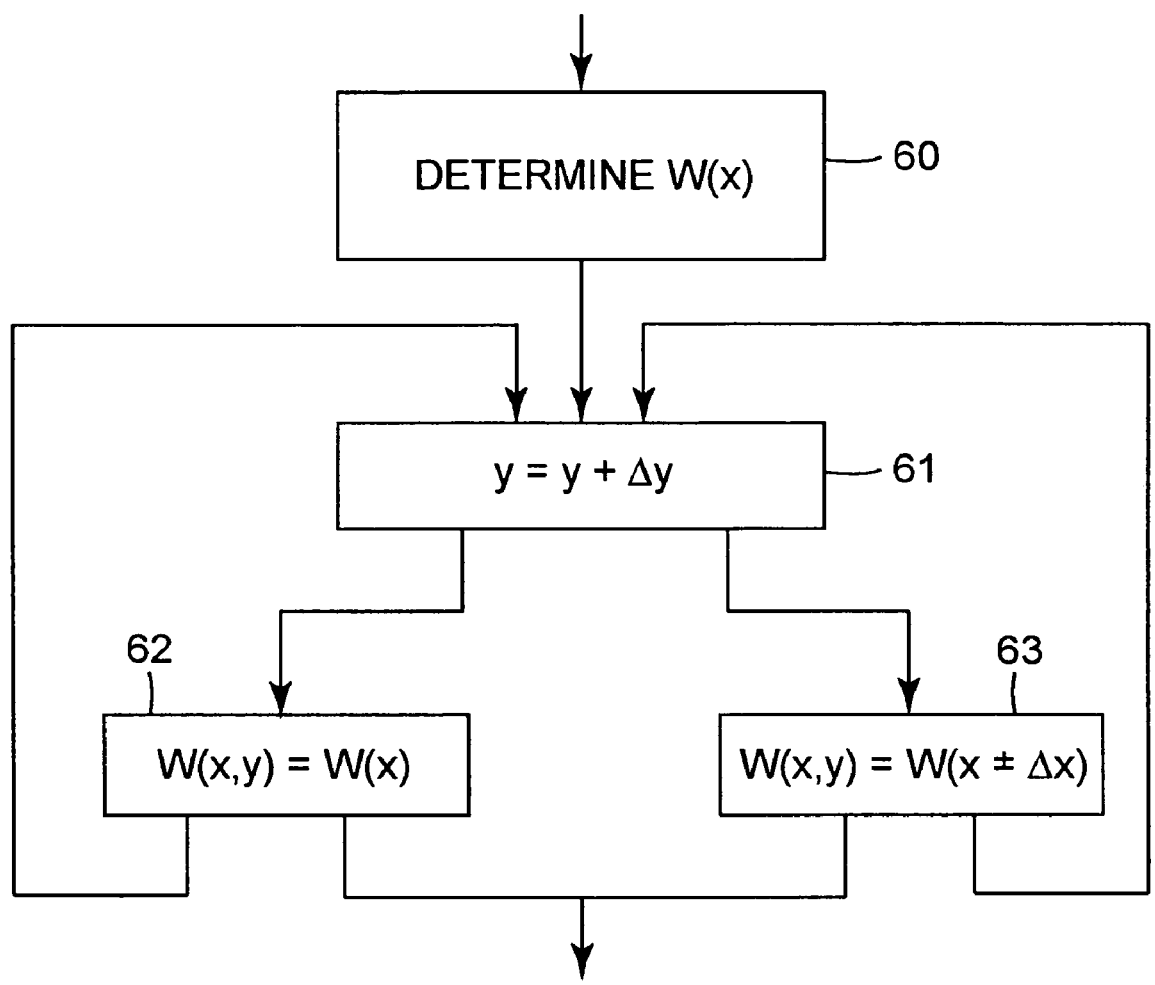

This is represented in the right path of the block diagram of FIG. 9, wherein after having determined in block 60 the distribution of points W(x) a cycle is entered, comprising block 61 of increment of coordinate y and a block 63 wherein the distribution of points W(x, y) at the current value of coordinate y is set as equal to the distribution of points W(x±Δx). For what said, this must be understood as meaning that at successive iterations, the + sign and the − sign are used alternately.

Preferably, moreover, the stagger interval Δx is equal to the interval Δy of repetition of the distribution W(x).

To avoid obtaining a distribution W(x) with a higher precision than the limits of the physical implementation of the extractor, it is preferable to reject from the distribution of points W(x) those points exhibiting a greater distance than a minimum distance $D_{min}$ from immediately adjacent points, that is, to impose condition $$x_{i+1} - x_i \leq D_{min} \quad (10)$$

Similarly, in determining the bidimensional distribution W(x,y) as set forth above, the following conditions will be imposed $$\Delta y \leq D_{min} \quad (11)$$

$$\Delta x \leq D_{min} \quad (12)$$

The minimum distance $D_{min}$ can, for example, correspond to the resolution obtainable through silk-screen printing.

Condition (10) could also be imposed upon the calculation of the coordinate of the point equally illuminated by the two point sources in adjacent points of the distribution according to expressions (3) and (4) given above, but in any case its validity must be checked again after any optional step of addition of second distributions, that is to say, after block 42 of FIG. 7 and/or after block 53 of FIG. 8.

In an alternative method for determining a distribution of diffusing points 10 of the light extractor 8, in particular such a distribution that the light emitted by the light guide lamp 1 is as uniform as possible, the procedure is as follows.

Firstly, the useful surface of extractor 8 is divided along the main propagation direction x, into intervals as little as desired, defining for each interval a diffusing-points-density variable $D_1, D_2, \ldots, D_n$.

Similarly, the emission surface 5 is divided along the main propagation direction x, into intervals as little as desired, defining for each interval a luminosity variable $N_1, N_2, \ldots, N_m$.

Then, the value of the luminosity variable $N_1, N_2, \ldots, N_m$ of each interval of the emission surface 5 is expressed, for example in the way described hereinafter, as a function of the diffusing-points-density variables $D_1, D_2, \ldots, D_n$ of extractor 8.

Finally, the values of the diffusing-points-density variables $D_1, D_2, \ldots, D_n$ of extractor 8 are calculated, such as to provide the desired values of the luminosity variables $N_1, N_2, \ldots, N_m$ of each interval of the emission surface 5, in particular such as to equal with one another the values of the luminosity variables $N_1, N_2, \ldots, N_m$ of all intervals of the emission surface 5.

More in particular, similarly to the first method described, the expression of the luminosity variables $N_1, N_2, \ldots, N_m$ can be obtained as follows.

Firstly, the light projected by the, or by each, illumination system 2, 2a is divided into a finite number of rays, each emitted according to a respective angle. For example, the number of considered rays can be selected as 2π/10, 2π/100, 2π/1000 etcetera, according to the desired precision.

Each emitted ray is given an initial luminosity value, which for simplicity can be value L=1.

Then, following the path of each ray, the luminosity variable $N_1, N_2, \ldots, N_m$ of each interval of the emission surface 5 is incremented by the value of the final luminosity L' of each ray incident within it with a greater angle, with respect to the main propagation direction, than its critical angle $\theta_{max}$, that is to say, such as to be transmitted outside the light guide lamp 1.

The luminosity value of each ray is changed according to the following criteria.

At each incidence of a ray within an interval of extractor 8, it can be reflected or diffused according to whether it is incident on a diffusing point 10 or on a reflecting point 9. The diffusing-points-density $D_i$ of the interval under consideration can be deemed to express the probability that the ray is reflected or diffused.

Thus, if the ray is reflected, the luminosity value of the reflected ray is obtained by multiplying the luminosity value of the incident ray by the absorption-in reflection coefficient of extractor, $Rif_8$, whereas if the ray is diffused, the luminosity value of each diffused ray is obtained by multiplying the luminosity value of the incident ray by the absorption-in diffusion coefficient of extractor, $Dif_8$.

At each incidence on the emission surface 5 with a smaller angle, with respect to the main propagation direction, than its critical angle $\theta_{max}$, the luminosity value of the reflected ray is obtained by multiplying the luminosity value of the incident ray by the absorption-in reflection coefficient of the emission surface, $Rif_5$.

By equalling the expressions of the luminosity variables $N_1, N_2, \ldots, N_m$ to the respective desired values, in particular by equalling them to one another, an equation system is obtained, its unknown values being the diffusing points densities $D_1, D_2, \ldots, D_n$ of extractor 8.

Such a system can be mathematically solved, for example using numerical methods. However, since the mathematical solution is not immediate, the following recursive method can be used.

The values of the diffusing-points-density variables $D_1, D_2, \ldots, D_n$ and the values of the luminosity variables $N_1, N_2, \ldots, N_m$ are preset to zero at the beginning.

At each iteration, the values of the luminosity variable $N_1, N_2, \ldots, N_m$ of each interval of the emission surface 5, expressed as said above, are evaluated on the basis of the current values of the diffusing-points-density variables $D_1, D_2, \ldots, D_n$ of extractor 8, namely on the basis of the current probability that the rays incident on extractor 8 are reflected or diffused.

At each iteration, the values of the diffusing-points-density variables $D_1, D_2, \ldots, D_n$ of extractor 8 are then individually incremented by a respective sufficiently small quantity.

The iteration ends when the values of the luminosity variables $N_1, N_2, \ldots, N_m$ are those desired, in particular when the values of the luminosity variables $N_1, N_2, \ldots, N_m$ of all intervals of the emission surface 5 are equal to one another.

For example, for an extractor 8 intended to be used in a light guide lamp 1 having two illumination systems 2, 2a, the increment of the values of the diffusing-points-density variables $D_1, D_2, \ldots, D_n$ can occur starting from the centre of extractor 8.

Similarly to the first method described, once obtained, the distribution of diffusing points along the main propagation direction can be repeated at constant intervals $\Delta y$ along direction y perpendicular thereto, optionally alternately staggering the distribution of points forwards and backwards in the main propagation direction by the preset minimum distance $\Delta x$.

Moreover, similarly to the first method described, it can be suitable to reject from the distribution of points those points exhibiting a greater distance than a preset minimum distance $D_{min}$ from the immediately adjacent points.

Figure 12:
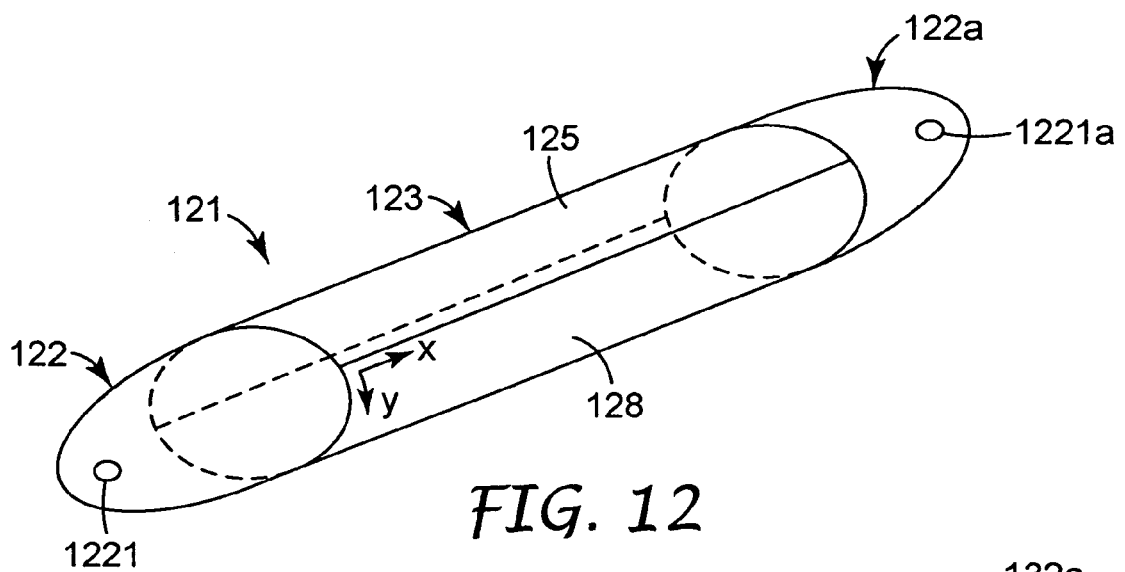
FIGS. 12 to 14 schematically show alternative embodiments of light guide lamps embodying the present invention.
Figure 13:
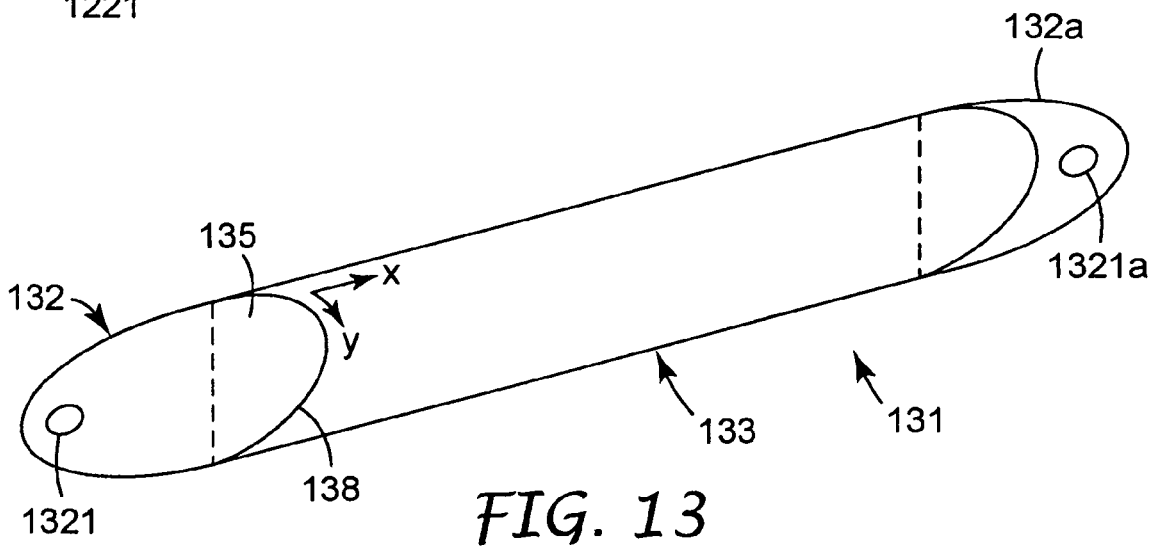
Figure 14:
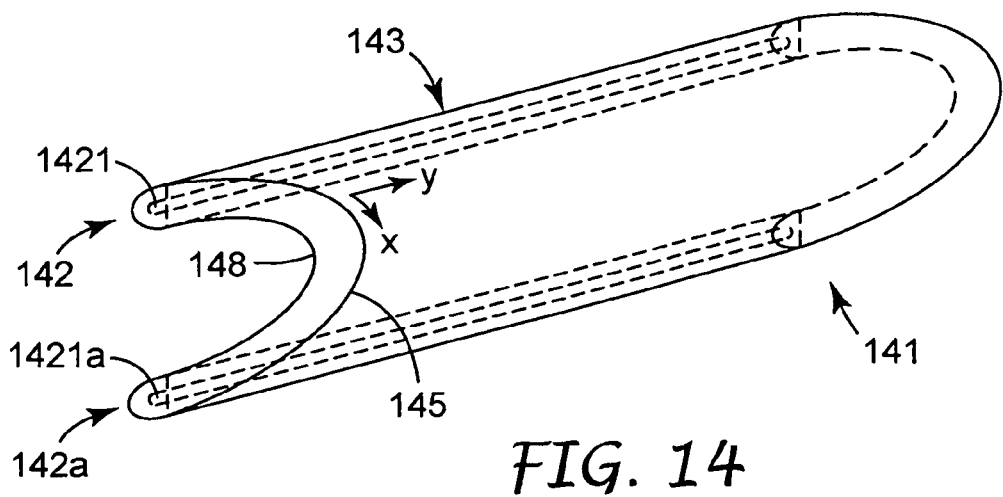

FIGS. 12 to 14 schematically show other embodiments of light guide lamps comprising a light extractor according to the present invention.

In the light guide lamp 121 shown in FIG. 12, the light extractor 128 and the emission surface 125 are both curved with the concavity towards the longitudinal axis of diffuser 123. More in particular, the cross section of each of them can be semicircular, semi-elliptical, semi-parabolic, parabolic or according to higher-order curves. The projection system 122, or each of the two projection systems 122, 122a in the illustrated embodiment, comprises a respective point light source 1221, 1221a.

In the light guide lamp 131 shown in FIG. 13, the emission surface 135 is plane and the light extractor 138 is curved towards the longitudinal axis of diffuser 133, more in particular according to a semicircular, semi-elliptical, semi-parabolic, parabolic cross section, or according to higher-order curves. As an alternative, it could be possible to provide a plane extractor and an emission surface curved towards the longitudinal axis of diffuser 133, more in particular according to a semicircular, semi-elliptical, semi-parabolic, parabolic cross section, or according to higher-order curves. Also in this case, the projection system 132, or each of the two projection systems 132, 132a in the illustrated embodiment, comprises a respective point light source 1321, 1321a.

Finally, in the light guide lamp 141 shown in FIG. 14, both the light extractor 148 and the emission surface 145 are curved, more in particular according to a semicircular, semi-elliptical, semi-parabolic, parabolic cross section, or according to higher-order curves, but they are arranged with the concavities facing the same direction. That is to say that the emission surface 145 is arranged inside extractor 148 or vice versa, so that the cross section of the light guide lamp 141 is horseshoe-shaped. In this case, the projection system 142, or each of the two projection systems 142, 142a in the illustrated embodiment, comprises a respective elongated tubular light source 1421, 1421a.

It is worth noting that the methods for determining the distribution of diffusing points illustrated with reference to the lamp having the parallelepipedal configuration shown in FIG. 1 are applicable also to the other described configurations of light guide lamp, any changes to be made being within the abilities of one skilled in the art.

Moreover, the first method described is particularly suitable to be performed through an electronic computer.

Figure 15:
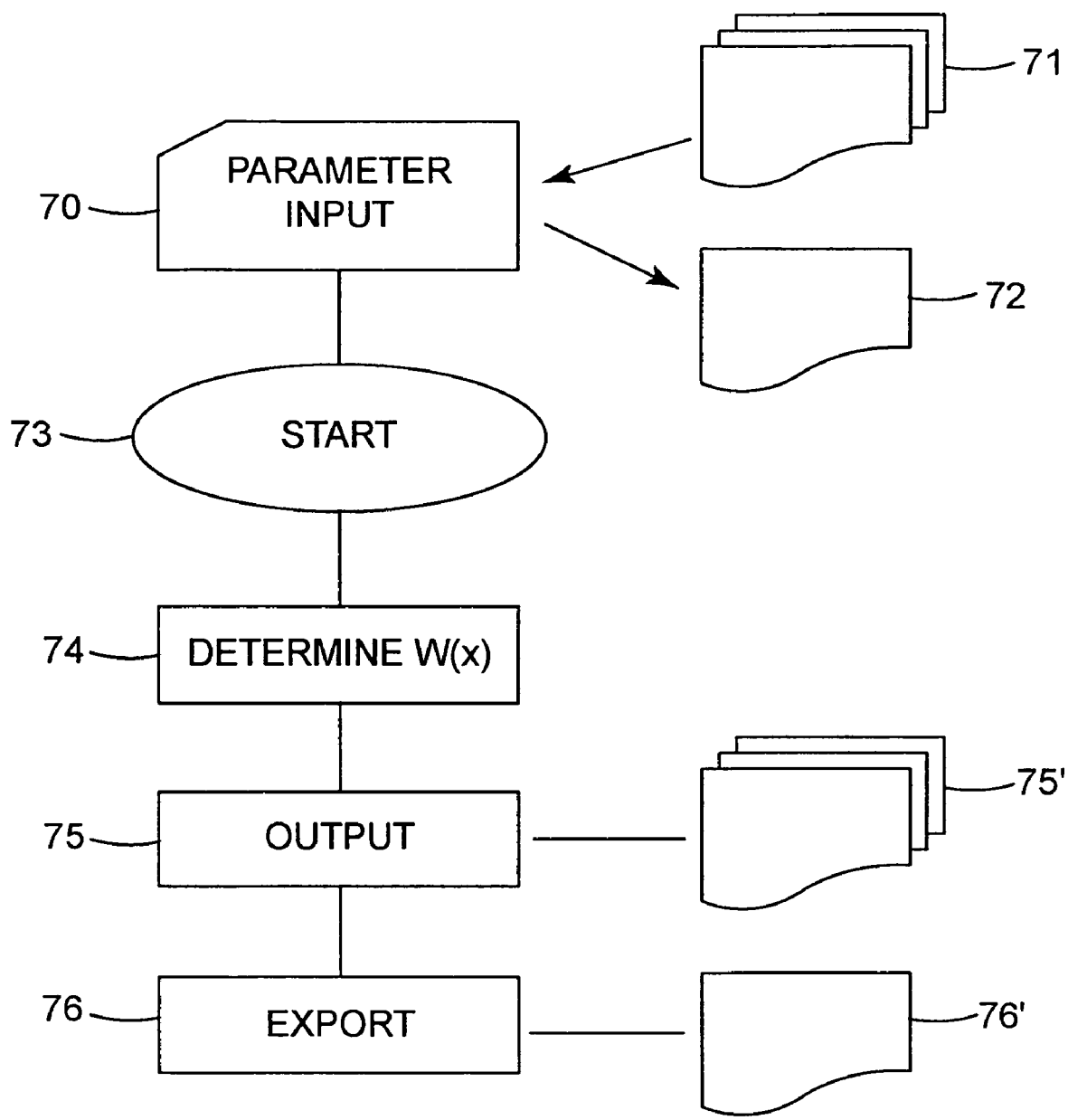
FIG. 15 shows a block diagram of a computer program suitable to perform the first method of the invention for determining the distribution of diffusing points.

FIG. 15 illustrates a block diagram representing a particularly preferred embodiment of a computer program comprising program code means suitable to perform the steps of the above method when the program is run on a computer.

No description of the code means relating to the various steps of the method is provided hereinbelow because deemed within the abilities of any programmer, as practically it is a matter of cycles, recursive routine calls, and application of numerical formulas. The distribution of points $W(x)$ or each second distribution $W_i(x)$, $W'(x)$, can for example be stored in a unidimensional array or in a list. The management of the recursive calls of the block diagram of FIG. 3, whereby all value pairs must be considered, could for example occur managing a pointer to the matrix (index), or through queue (FIFO) or stacked (LIFO) structures.

As shown at block 70, the computer program comprises means, such as a form, for receiving in input one or more of the following parameters:

critical angle $\theta_{max}$ of the emission surface 5, shape and size of extractor 8, the shape for example being selectable from a list comprising the alternatives: rectangular, with semicircular section, with semi-elliptical section, with semi-parabolic section, with parabolic section, shape and size of the emission surface 5, the shape for example being selectable from a list comprising the alternatives: rectangular, with semicircular section, with semi-elliptical section, with semi-parabolic section, with parabolic section, maximum distance of extractor 8 from the emission surface 5, number, type, intensity K and nature of the light sources 21, 21a of the illumination system 2, minimum distance $D_{min}$ between the points of the distribution of points, absorption-in reflection coefficient of extractor $Rif_8$, absorption-in diffusion coefficient of extractor $Dif_8$, absorption-in reflection coefficient of the emission surface $Rif_5$, maximum number of successive reflections, on the emission surface 5 and on extractor 8, to be considered.

In this connection, respective default values can be provided. Moreover, there can be provided means for controlling that the values entered are acceptable, in particular, that they are positive numbers, that the size of the extractor 8 and of the emission surface 5 are compatible with one another and preferably, that the ratio between length 1 in the main propagation direction and distance h between the extractor and the emission surface is equal to 20. In fact, such a ratio is preferred since in this way the light propagates with a sufficiently small number of incidences, thus with few losses.

The values entered can be saved in a file, as shown in block 71, and be retrieved from the file, as shown in block 72, to be changed or to repeat the processing.

Then, in a block 74, the program performs the various steps of the method of the invention, preferably subject to receiving a start signal, as shown in block 74. For example, said start signal can be the pressure of a keyboard key, of a button of a graphical interface or other.

Then, at a block 75, the program generates one or more outputs, represented by block 75', among:

the coordinates of the points of the distribution W(x), for example in a spreadsheet, the percent density of the points of the distribution in elementary intervals, a report of the preset parameters, for example as a spreadsheet, a graphical representation of the distribution of points W(x) or W(x,y), for example with a graph with linear functions showing the gradual increase in points, the geometry of each illumination system of the light guide lamp for which the extractor is intended, as a function of the preset average distance h between extractor 8 and emission surface 5 and of the preset critical angle $\theta_{max}$ of the emission surface 5, in particular the focus 6 of the reflecting parabola 22, 22a.

Preferably, moreover, at a block 76, the program generates an export output, that is to say:

a file 76' of the points of the distribution W(x) in a format readable by a printing, in particular a silk-screen printing machine.

Practically, such a computer program can be disseminated on an information network, in particular on the Internet, or embodied in a computer readable means, such as a floppy disk, a CD-ROM, a CD-R and the like.

It is manifest that several changes, modifications, replacements and integrations can be made to the previously described embodiments without thus departing from the scope of the invention, as defined by the following claims.

In particular, it must be understood that the special "dotted" useful surface, that is, consisting of diffusing points and of complementary reflecting points, can be useful also in tridimensional-body extractors, intended to be used in axial position in the light guide lamp.

In particular, it is worth noting that the diffusing points and the reflecting points can be applied according to the predetermined and respectively complementary distribution on a neutral substrate, or by applying the reflecting points on a diffusing base layer. Thus, any reference—in the present description and attached claims—to a "point of the reflecting base layer" must be interpreted as equivalent to the expression "reflecting points".

Moreover, in place of the illumination systems with point source or fluorescent tube light source provided with reflecting parabola, plane illumination systems can be used in the various embodiments, obtained through a plurality of LEDs.

Moreover, those skilled in the art will understand that both as the reflecting surface and as the emission surface, among the other materials, the multilayer optical film described in the above-mentioned patent U.S. Pat. No. 5,882,774 could advantageously be used.

What is claimed is:

1. Method for determining a distribution (W(x)) along a main direction (x) of diffusing points on a useful surface, elsewhere reflecting, of a light extractor intended to be coupled to an emission surface, transparent for rays propagating with a smaller angle than a predetermined critical angle ($\theta_{max}$) and internally reflecting for rays propagating with a greater angle than the critical angle ($\theta_{max}$), in a diffuser for a light guide lamp having a first illumination system suitable to project the light of a light source in the diffuser with smaller angles than the critical angle ($\theta_{max}$), the method comprising the steps of:

(a) setting a first point (A, $x_1$) of the distribution (W(x)) as the point of final incidence on the extractor closest to the illumination system of a light ray propagating according to a preselected type of trajectory, (b) setting a second point (B, $x_2$) of the distribution (W(x)) as the point of final incidence on the extractor farthest from the illumination system of a light ray propagating according to the preselected type of trajectory, (c) recursively determining, for each point ($x_i$) of the distribution of points, a new point (X, x) of the distribution as the point of the extractor equally illuminated by a first point source arranged at the preselected point ($x_i$) of the distribution, and by a second point source arranged at a next adjacent point ($x_{i+1}$) of the distribution, intensities (I(x)) of the point sources being a function of an intensity (K) of the light source and of a characteristic distance of the preselected type of trajectory, wherein a determined distribution of diffusing points is established as including the first point, the second point, and the recursively determined points, and constructing a light extractor based upon the determined distribution of diffusing points.

2. Computer readable medium encoded with a computer program comprising program code means suitable to perform the steps of the method of claim 1.

3. Computer readable medium according to claim 2, wherein the computer program is adapted to receive an input relating to at least one parameter from the group consisting of:
- a critical angle ($\theta_{max}$) of the emission surface to which the extractor is intended to be coupled,
- a shape of the extractor,
- a size of the extractor,
- a shape of the emission surface to which the extractor is intended to be coupled,
- a size of the emission surface to which the extractor is intended to be coupled,
- a maximum distance of the extractor from the emission surface to which the extractor is intended to be coupled,
- a number, type, intensity and nature of the light source of the illumination system to which the extractor is intended to be coupled,
- a minimum distance ($D_{min}$) between the points of determined distribution of points (W(x)),
- an absorption-in reflection coefficient of the extractor ($Rif_8$),
- an absorption-in diffusion coefficient of the extractor ($Dif_8$),
- an absorption-in reflection coefficient of the emission surface ($Rif_5$) to which the extractor is intended to be coupled,
- a type of trajectory to be considered and,
- a maximum number of reflections to be considered.

4. Computer readable medium according to claim 2, wherein the computer program is adapted to save parameters entered into a file and to load the parameters from a file.

5. Computer readable medium according to claim 2, wherein the computer program is adapted to generate at least one output from the group consisting of:
- coordinates of the determined distribution of points (W(x)),
- a percent density of the determined distribution of points (W(x)) in elementary intervals,
- a report of preset parameters,
- a graphical representation of the determined distribution of points (W(x)),
- a file the determined distribution of points (W(x)) in a format readable by a printing machine,
- a geometry of each illumination of the light guide lamp for which the extractor is intended, as a function of a preset maximum distance between the extractor and the emission surface and of a preset critical angle ($\theta_{max}$) of the emission surface.

6. Method according to claim 1, further comprising:
(g) determining a repetition of the first point, the second point, and the recursively determined points at constant intervals ($\Delta y$) along a direction (y) perpendicular to the main propagation direction (x) of the extractor; and
adding the determined repetition to the determined distribution of diffusing points.

7. Method according to claim 6, wherein step (g) includes:
(g1) alternately staggering the first point, the second point, and the recursively determined points forwards and backwards in the main propagation direction (x) by a constant interval ($\Delta x$).

8. Method according to claim 1, characterized in that in steps (a), (b), (c) the trajectory type is classified on the basis of the number of reflections within the diffuser.

9. Method according to claim 1, characterized in that in step (c), when the preselected type of trajectory consists of the rays that from the light source of the light guide lamp directly strike the extractor, the intensity (I(x)) of each point source is given by the intensity (K) of the light source, multiplied by an absorption-in diffusion coefficient of the extractor ($Dif_8$) and divided by the squared distance of the point of the source point from the light source.

10. Method according to claim 1, characterized in that in step (c), when the preselected type of trajectory consists of the rays that from the light source strike the extractor after undergoing at least one reflection by the emission surface and optimally by the extractor, the intensity (I(x)) of each point source is given by the intensity (K) of the light source, multiplied by an absorption-in diffusion coefficient of the extractor ($Dif_8$), multiplied, for each reflection onto the emission surface, by an absorption-in coefficient of the emission surface ($Rif_5$), multiplied, for each reflection onto the extractor, by an absorption-in reflection coefficient of the extractor ($Rif_8$), and divided by the squared projection, along the main propagation direction (x), of the portion of the ray under consideration from the light source to the first reflection point.

11. Method according to claim 1, further comprising the steps of:
(d) determining at least a second distribution of points ($W_i(x)$) through steps (a), (b), (c) for a different type of trajectory,
(e) adding each second distribution of points ($W_i(x)$) to the determined distribution of points (W(x)).

12. Method according to claim 1, wherein the extractor is intended to be inserted into a light guide lamp having a second illumination system that is specular to the first illumination system and arranged at the opposed end, the method further comprising the step of:
(f) adding specular points (W'(x)) of each of the first point, the second point, and the recursively determined points to the of determined distribution of diffusing points (W(x)).

13. Method according to claim 1, further comprising:
(h) rejecting, from the determined distribution of points, those points exhibiting a distance that is greater than a preset minimum distance ($D_{min}$) from the immediately adjacent points.

14. Method for determining a distribution (W(x)) along a main propagation direction (x) of diffusing points on a useful surface, elsewhere reflecting, of a light extractor intended to be coupled to an emission surface, transparent for rays propagating with a smaller angle than a predetermined critical angle ($\theta_{max}$) and internally reflecting for rays propagating with a greater angle than the critical angle ($\theta_{max}$), in a diffuser for a light guide lamp having at least one illumination system suitable to project the light of a light source into the diffuser with smaller angles than the critical angle ($\theta_{max}$), the method comprising the steps of:
(a) defining, for each interval of a preselected length along the main propagation direction (x) of the useful surface of the extractor, a diffusing-points-density variable ($D_i$, $D_2$, ... $D_n$),
(b) defining, for each interval of a preselected length along the main propagation direction (x) of the emission surface, a luminosity variable ($N_1$, $N_2$, ... $N_m$),
(c) expressing the value of the luminosity variable ($N_1$, $N_2$, ... $N_m$) of each interval of the emission surface as a function of the diffusing-points-density variables ($D_1$, $D_2, \ldots D_n$) of the extractor, (d) calculating the values of the diffusing-points-density variables ($D_1, D_2, \ldots D_n$) of the extractor such as to equal with a corresponding one of the values of the luminosity variables ($N_1, N_2, \ldots N_m$) of all intervals of the emission surfaces, determining a distribution of diffusing points based upon the calculated values of the diffusing-points-density variables, and conveying the determined distribution of diffusing points to a user.

15. Method according to claim 14, further comprising:

(e) determining a repetition of the determined distribution of points at constant intervals ($\Delta y$) along a direction (y) perpendicular to the main propagation direction (x) of the extractor, and establishing the determined distribution of diffusion points as including the determined repetition.

16. Method according to claim 15, wherein step (e) includes:

(e1) alternately staggering the determined distribution of points forwards and backwards in the main propagation direction (x) by a constant interval ($\Delta x$).

17. Method according to claim 14, wherein:

step (a) includes a sub-step (a1) of presetting to zero the values of the diffusing-points-density variables ($D_i, D_2, \ldots D_n$), step (b) includes a sub-step (b1) of presetting to zero the values of the luminosity variables ($N_1, N_2, \ldots N_m$), and step (d) includes:

(d1) evaluating the values expressed at step (c) of the luminosity variable ($N_1, N_2, \ldots N_m$) of each interval of the emission surface on the basis of the current values of the diffusing-points-density variables ($D_i, D_2, \ldots D_n$) of the extractor, (d2) individually incrementing the values of the diffusing-points-density variables ($D_i, D_2, \ldots D_n$) of the extractor and (d3) iteratively repeating steps (d1) and (d2) until the values of the luminosity variable ($N_1, N_2, \ldots N_m$) of all intervals of the emission surface evaluated in step (d1) are equal to one another.

18. Method according to claim 14, wherein step (c) includes:

(c1) hypothetically splitting light projected by the at least one illumination system into a finite number of rays, each having an initial luminosity value, (c2) incrementing the luminosity variable ($N_1, N_2, \ldots N_m$) of each interval of the emission surface by the value of the final luminosity of each ray incident on it with a greater angle, with respect to the main propagation direction (x), than its critical angle ($\theta_{max}$), wherein:

at each incidence of a ray in an interval of the extractor, an evaluation of whether the ray is reflected or diffused is made on the basis of the value of the respective diffusing-points-density variables ($D_1, D_{2, \ldots Dn}$), if the ray is evaluated to be reflected, a luminosity value of the reflected ray is obtained by multiplying the luminosity value of the incident ray by an absorption-in diffusion coefficient of the extractor ($Dif_g$), at each incidence on the emission surface with a smaller angle, with respect to the main propagation direction, than its critical angle ($\theta_{max}$), the luminosity value of the reflected ray is obtained by multiplying the luminosity value of the incident ray by an absorption-in reflection coefficient of the emission surface ($Rif_s$).

19. Method according to claim 14, further comprising:

(f) rejecting, from the determined distribution of points (W(x)), those points exhibiting a distance that is greater than a preset minimum distance ($D_{min}$) from the immediately adjacent points.

* * * * *